(12) United States Patent
Chasse et al.

(10) Patent No.: US 11,821,453 B2
(45) Date of Patent: Nov. 21, 2023

(54) FASTENER HAVING IMPROVED WOBBLE CONTROL, FASTENING SYSTEM INCLUDING THE SAME, AND METHOD OF FORMING THE SAME

(71) Applicants: Carl Chasse, Stafford Springs, CT (US); SHEH FUNG SCREWS CO., LTD, Kaohsiung (TW)

(72) Inventors: Carl Chasse, Stafford Springs, CT (US); Chen Chun-Yen, Kaohsiung (TW)

(73) Assignees: SHEH FUNG SCREWS CO., LTD., Kaohsiung (TW); Carl Chasse, Stafford Springs, CT (US)

( * ) Notice: Subject to any disclaimer, the term of this patent is extended or adjusted under 35 U.S.C. 154(b) by 568 days.

(21) Appl. No.: 16/846,930

(22) Filed: Apr. 13, 2020

(65) Prior Publication Data

US 2020/0332821 A1   Oct. 22, 2020

Related U.S. Application Data

(60) Provisional application No. 62/835,813, filed on Apr. 18, 2019.

(51) Int. Cl.
F16B 23/00   (2006.01)

(52) U.S. Cl.
CPC ........ *F16B 23/003* (2013.01); *F16B 23/0038* (2013.01); *F16B 23/0092* (2013.01)

(58) Field of Classification Search
CPC ............... F16B 23/003; F16B 23/0092; F16B 23/0007; F16B 23/0053; F16B 23/0038; B25B 15/004; B25B 15/005

USPC .......... 411/410, 403, 407; 81/436–439, 460, 81/461
See application file for complete search history.

(56) References Cited

U.S. PATENT DOCUMENTS

| 3,108,623 | A |   | 10/1963 | Muenchinger |
| 3,888,144 | A | * | 6/1975  | Parsons ............... F16B 23/0038 |
|           |   |   |         | 81/436 |
| 4,089,357 | A |   | 5/1978  | Gill |
| 5,020,954 | A |   | 6/1991  | Dreger |
| 5,358,368 | A |   | 10/1994 | Conlan et al. |

(Continued)

FOREIGN PATENT DOCUMENTS

| CN | 107023551       |    | 8/2017 |
| DE | 202017002786 U1 |    | 1/2018 |

(Continued)

OTHER PUBLICATIONS

GlobalSources Product Information for: Cap Head Torx Slotted Socket Shoulder Screws; retrieved from https://www.globalsources.com/gsol/I/Screw/p/sm/1155944900.htm; Date retrieved Apr. 13, 2020, 4 pages.

(Continued)

*Primary Examiner* — Flemming Saether
(74) *Attorney, Agent, or Firm* — CANTOR COLBURN LLP

(57) ABSTRACT

A fastener including a first recess and a second recess adjacent the first recess. The first recess includes a side surface defining a shape of the first recess and a stability surface oriented at an angle of greater than 1° and less than or equal to 89° relative to a major axis of the fastener.

17 Claims, 5 Drawing Sheets

(56) References Cited

U.S. PATENT DOCUMENTS

| | | | |
|---|---|---|---|
| 5,509,334 A * | 4/1996 | Shinjo | F16B 23/00 81/436 |
| 5,553,983 A | 9/1996 | Shinjo | |
| 5,897,280 A | 4/1999 | Dicke | |
| 6,016,727 A | 1/2000 | Morgan | |
| 6,601,482 B2 | 8/2003 | Hughes et al. | |
| 6,682,283 B2 | 1/2004 | Mann et al. | |
| 6,951,158 B1 | 10/2005 | Edland | |
| 6,988,432 B2 | 1/2006 | Brooks | |
| 7,101,133 B2 | 9/2006 | Dicke | |
| 7,225,710 B2 | 6/2007 | Pacheco, Jr. | |
| 7,581,910 B2 | 9/2009 | Nebl et al. | |
| 7,730,812 B2 | 6/2010 | Edland | |
| 7,785,055 B2 | 8/2010 | Dicke | |
| 8,291,795 B2 | 10/2012 | Hughes et al. | |
| 8,585,339 B2 | 11/2013 | Ishikawa | |
| 8,616,097 B2 | 12/2013 | Hughes et al. | |
| 8,739,660 B2 | 6/2014 | Edland et al. | |
| 9,044,843 B1 | 6/2015 | Mokhtee | |
| 9,261,127 B2 | 2/2016 | Buhl | |
| D769,690 S | 10/2016 | Campbell, II | |
| 9,562,557 B2 | 2/2017 | Ross | |
| 9,790,978 B2 | 10/2017 | Hsu | |
| 10,076,373 B2 | 9/2018 | Strnad et al. | |
| 10,125,806 B2 | 11/2018 | Hung | |
| 10,195,723 B2 | 2/2019 | Lukes et al. | |
| 10,288,105 B2 | 5/2019 | Saigo et al. | |
| 10,385,902 B2 * | 8/2019 | Wunderlich | B25B 21/00 |
| 10,428,859 B2 * | 10/2019 | Falkenstein | F16B 23/0023 |
| 10,470,852 B2 | 11/2019 | Xam-Mar Mangrane | |
| 10,731,692 B2 * | 8/2020 | Goss | B21K 1/463 |
| 2003/0059276 A1 * | 3/2003 | Chen | F16B 23/0092 411/403 |
| 2004/0058739 A1 | 3/2004 | Hughes | |
| 2006/0228189 A1 | 10/2006 | Lin | |
| 2006/0233626 A1 | 10/2006 | Lin | |
| 2007/0245863 A1 | 10/2007 | Edland | |
| 2008/0279653 A1 * | 11/2008 | Brooks | B21K 1/463 470/9 |
| 2009/0220321 A1 | 9/2009 | Sakamura | |
| 2011/0116891 A1 | 5/2011 | Notaro et al. | |
| 2012/0165107 A1 * | 6/2012 | Guo | B21K 1/463 81/460 |
| 2015/0104271 A1 | 4/2015 | Ross | |
| 2016/0305462 A1 | 10/2016 | Wunderlich et al. | |
| 2017/0105820 A1 | 4/2017 | Aravena | |
| 2018/0098799 A1 | 4/2018 | Songer | |
| 2019/0003510 A1 | 1/2019 | Chasse et al. | |
| 2019/0186526 A1 | 6/2019 | Dilling | |
| 2020/0332821 A1 | 10/2020 | Chasse et al. | |
| 2021/0246928 A1 | 8/2021 | Chasse | |

FOREIGN PATENT DOCUMENTS

| | | |
|---|---|---|
| DE | 202017005611 U1 | 1/2018 |
| EP | 0598561 A1 | 5/1994 |
| EP | 0926362 A1 | 6/1999 |
| EP | 1538348 A1 | 6/2005 |
| EP | 3399198 A1 | 11/2018 |
| JP | 6742587 B2 | 8/2020 |
| TW | M472125 U | 2/2014 |
| TW | 201623814 A | 7/2016 |
| WO | 2015027704 A1 | 3/2015 |
| WO | 2015185828 A1 | 12/2015 |
| WO | 2018107189 A1 | 6/2018 |

OTHER PUBLICATIONS

International Search Report for International Application No. PCT/US2020/027926; Application Filing Date: Apr. 13, 2020; dated Jul. 16, 2020, 2 pages.

Written Opinion for International Application No. PCT/US2020/027926; Application Filing Date: Apr. 13, 2020; dated Jul. 16, 2020, 8 pages.

Industrial Fasteners Institute, IFI-562, Acceptance Gaging for Fastener Drive Systems with Six Lobes, 6 pages.

ISO 10664, Hexalobular internal driving feature for bolts and screws, Second edition, Jul. 1, 2005, 12 pages.

* cited by examiner

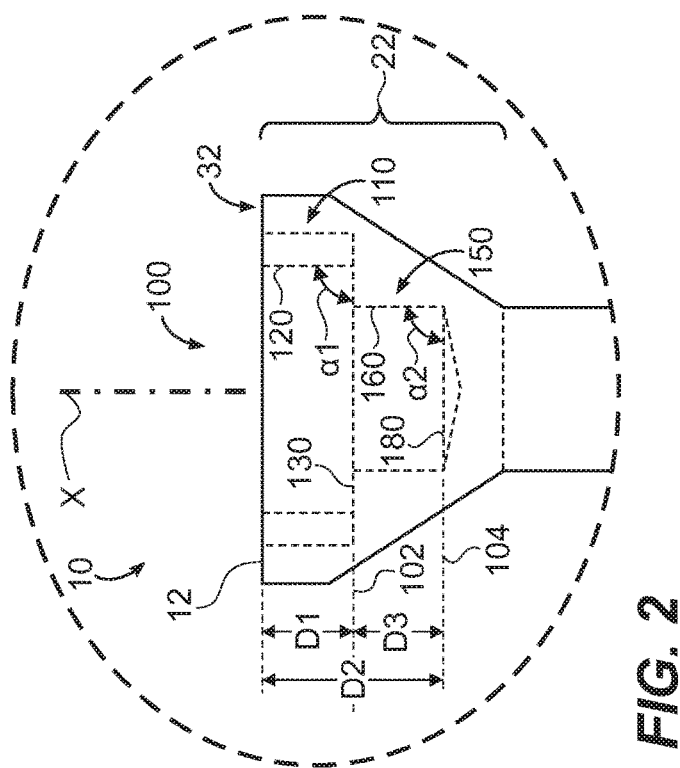
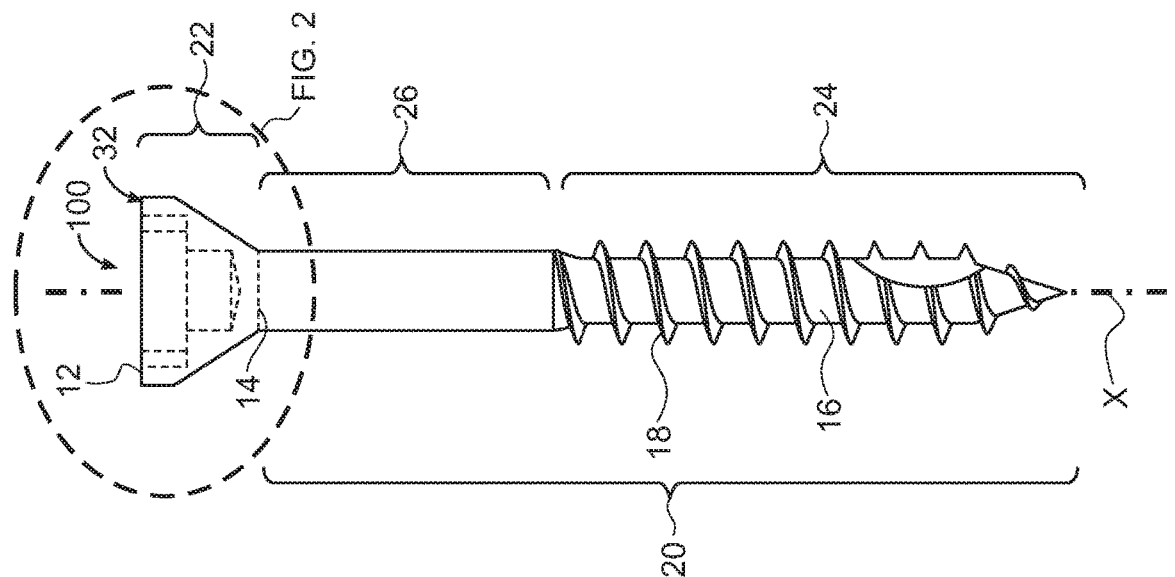
FIG. 2
FIG. 1

FASTENER HAVING IMPROVED WOBBLE CONTROL, FASTENING SYSTEM INCLUDING THE SAME, AND METHOD OF FORMING THE SAME

CROSS-REFERENCE TO RELATED APPLICATION

This application claims priority to and the benefit of U.S. Provisional Application No. 62/835,813, filed Apr. 18, 2019, and all the benefits accruing therefrom under 35 U.S.C. § 119, the content of which in its entirety is herein incorporated by reference.

BACKGROUND

Disclosed is a fastener having improved wobble control, reduced stripping, a fastening system including the same, and a method of forming the same.

Fasteners are manufactured with a variety of different recess shapes, such as, for example, slotted or cruciform. A tool, e.g., a bit or driver bit, can be used to insert and remove a fastener. An end of the tool may have a shape configured for insertion into a head of a fastener to facilitate turning of the fastener for insertion or removal.

Recess drive shapes benefits that may be favorable for different applications, or favored in different regions of the world. For example, in the United States consumer market a fastener having a hexalobular recess shape is widely available. The hexalobular recess may allow greater torque to be applied to the recess through a mating hexalobular tool, without stripping the hexalobular recess. Nonetheless, there remains a need for a recess shape, and a corresponding tool, with improved performance.

SUMMARY

According to an embodiment, a fastener is provided. The fastener includes: a first recess and a second recess adjacent the first recess. The first recess includes a side surface defining a shape of the first recess and a stability surface oriented at an angle of greater than 1° and less than or equal to 89° relative to a major axis of the fastener.

In addition to one or more of the features described above, or as an alternative, the first recess may include at least two stability surfaces each oriented at an angle of greater than 1° and less than or equal to 89° relative to the major axis of the fastener.

The first recess may include a hexalobular shape.

The stability surface may be between adjacent lobes of the hexalobular shape.

The side surface may be oriented at an angle of greater than or equal to 0° and less than or equal to 30° relative to the major axis of the fastener.

The angle of orientation of the side surface relative to the major axis of the fastener may be less than the angle of orientation of the stability surface relative to the major axis of the fastener.

The first recess may include a hexalobular shape having a lobe-to-lobe distance of 5.55 millimeters to 5.65 millimeters, and the second recess may include a rectilinear shape having a length of 2.82 millimeters to 2.86 millimeters.

The second recess may include a rectilinear shape.

The first recess may include four stability surfaces each oriented at an angle of greater than 1° and less than or equal to 89° relative to the major axis of the fastener.

The first recess may include a hexalobular shape, and each of the stability surfaces may be between adjacent lobes of the hexalobular shape.

The fastener may include a head including the first recess and the second recess; and a shank extending from the head in a direction along the major axis of the fastener.

According to an embodiment, a method of forming the fastener may include driving a punch into a head of the fastener to form the fastener including the first recess and the second recess in the head of the fastener to form the fastener.

According to an embodiment, a fastening system may include the fastener; and a tool having a shape configured to engage with the first recess, configured to engage with the second recess, or configured to engage with the first recess and the second recess.

In addition to one or more of the features described above, or as an alternative, the stability surface may be configured to contact the tool, when the tool is inserted in the first recess and the second recess.

The first recess may include a hexalobular shape having a lobe-to-lobe distance of 5.55 millimeters to 5.65 millimeters, and the second recess may include a rectilinear shape having a length of 2.82 millimeters to 2.86 millimeters.

The stability surface may be between adjacent lobes of the hexalobular shape.

The stability surface may be configured to allow the tool to be inserted into at least 90% of a total depth of the first recess and the second recess, the depth being measured in a direction parallel to the major axis of the fastener.

According to an embodiment, a fastening system is provided. The fastening system includes: a fastener, which includes a first recess and a second recess adjacent the first recess. The first recess includes a hexalobular shape and a stability surface between adjacent lobes of the hexalobular shape. The fastening system also includes a tool having a shape configured to engage with the first recess, configured to engage with the second recess, or configured to engage with the first recess and the second recess.

In addition to one or more of the features described above, or as an alternative, the tool may include a first hexalobular shape configured to engage with the first recess and a second rectilinear shape configured to engage with the second recess.

The stability surface may be configured to allow the tool to be inserted into at least 90% of a total depth of the first recess and the second recess, the depth being measured in a direction parallel to a major axis of the fastener.

BRIEF DESCRIPTION OF THE DRAWINGS

The following descriptions should not be considered limiting in any way. With reference to the accompanying drawings, in which like elements are numbered alike:

FIG. 1 illustrates an embodiment of a fastener;

FIG. 2 illustrates an enlarged view of a head of the fastener of FIG. 1 having a flat head, in accordance with an embodiment of the disclosure;

DETAILED DESCRIPTION

Figure 4:
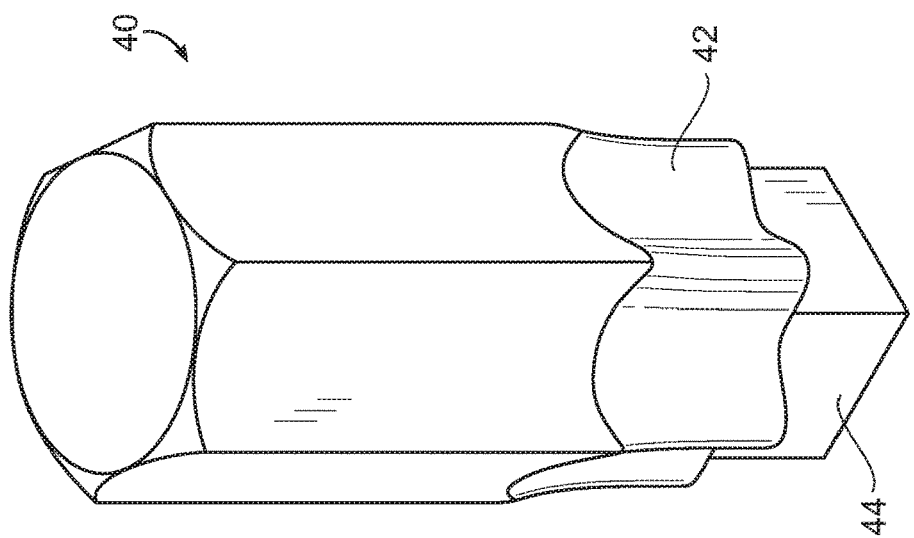
FIG. 4 illustrates an isometric view of an embodiment of a tool for driving a fastener.

A fastener, e.g., a threaded fastener, having a stacked compound recess can reduce or avoid stripping of the recess of the fastener when torque is applied to the recess by a tool. The tool is the same as and may also be referred to as a bit, mating bit, driver, or driver-bit. For example, a fastener having a stacked compound recess may include an upper first recess having a first shape, e.g., hexalobular recess, which is a recess having six lobes and may also be referred to as a six-lobed recess, and a lower second recess between the first recess and a shank of the fastener having a second shape, e.g., a rectilinear or a square shape, such as a Robertson square shape. The second recess may be located adjacent the first recess.

A rectilinear recess (e.g., a Robertson Square) may offer improved stiction for a mating tool, e.g., a tool having a shape configured to engage the rectilinear recess. The tool having a shape configured to engage the rectilinear recess can be used to rotatably drive, e.g., insert or remove, the fastener including the first upper recess having a hexalobular recess shape and the lower second recess having the rectilinear shape. However, when the tool having the shape configured to engage the rectilinear recess is inserted into a recess having a compound recess comprising an upper hexalobular recess and a lower second recess having a square shape, undesirable wobble may result when the tool is used to drive the fastener. Wobble refers to an amount of off-axis movement a tool inserted into the recess may move before the tool contacts the recess to resist such movement.

While not wanting to be bound by theory, it has been surprisingly discovered that a side surface of the tool may interfere with a lobe of the hexalobular recess. The inventors have discovered that interference of the tool with a lobe of the hexalobular recess of the fastener can prevent the tool from suitably engaging the fastener, resulting in undesirable wobble. The undesirable wobble can result in cam-out or stripping of the fastener recess, for example. A configuration which provides improved fit and contact between the tool and fastener having the upper hexalobular recess and a lower rectilinear recess has been developed. The improved configuration results in unexpectedly improved stability when driving the fastener.

Further description of the disclosed fastener and tool are presented herein by way of exemplification and not limitation with reference to the Figures.

FIG. 1 schematically illustrates a fastener 10 having a stacked compound recess 100. The fastener 10 includes shank 20 and a head 22. A head 22 head includes an upper end 12 and a lower end 14 opposite the upper end 12. The shank 20 extends from the lower end 14 of the head 22. The shank 20 may be attached to the head 22 at the lower end 14 of the head 22 or formed with the head 22 at the lower end 14 of the head 22. The shank 20 includes a threaded portion 24. The threaded portion 24 includes a thread 18 helically wrapped around a shaft 16 of the shank 20. The thread 18 may be wrapped around the shaft 16 such that the fastener 10 may be right-handed or left-handed. There may be a non-portion 26 interposed between the threaded portion 24 and the lower end 14 of the head 22 of the fastener 10, as shown in FIG. 1.

A top surface of the head 22 of the fastener 10 may be flat, as illustrated in FIG. 1. While a flat head is utilized for illustration, the fastener may have other head types such as, for example, a head having an oval, button, round, truss, cheese (e.g., having a disc with a cylindrical outer edge, height approximately half the head diameter, and a flat bearing surface), fillister, pan washer, cylinder, hexagon, indented hexagon, washer, or pan configuration.

FIG. 2 illustrates an enlarged cross-sectional view of the fastener 10 shown in FIG. 1 having a top surface 32 that is flat. The head 22 includes a top surface 32 located at the upper end 12 of the head 22. The top surface 32 may be a substantially flat surface oriented about perpendicular with a major axis X of the fastener 10 having the stacked compound recess 100. The head 22 of the fastener 10 includes the stacked compound recess 100 formed on the top surface 32. The stacked compound recess 100 is formed in the top surface 32 of the head 22 and extends into the head 22.

Figure 3:
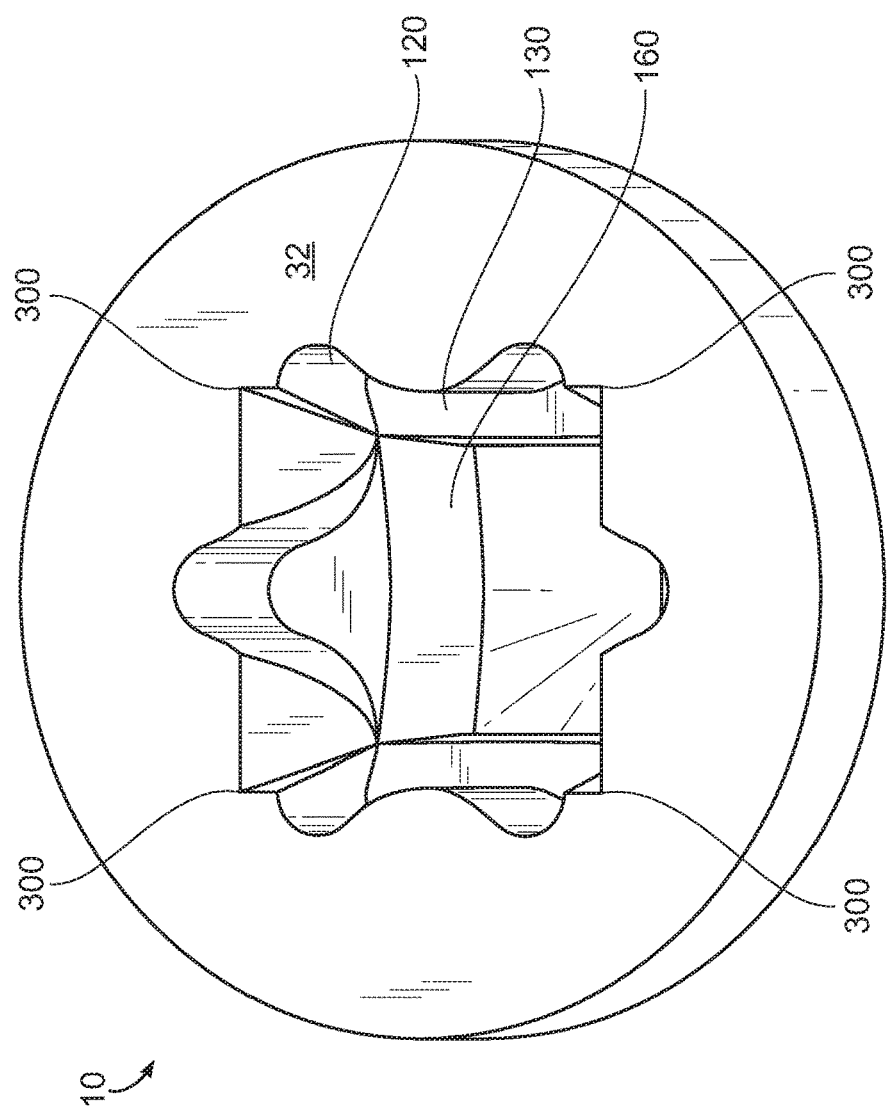
FIG. 3 illustrates an isometric view of the head of the fastener of FIG. 1, in accordance with an embodiment of the disclosure.

Referring now to FIG. 2 and FIG. 3, with continued reference to FIG. 1, the stacked compound recess 100 includes a first recess 110 having a first shape and a second recess 150 having a second shape. The first recess 110 may be configured to be driven (e.g., drivable by a tool) and the second recess 150 is configured to be driven, such that the first recess 110 and the second recess 150 may be driven independently and/or in combination using a tool having a shape that mates to the first recess 110 and/or the second recess 150. For example, the tool may have a shape configured to engage with the first recess 110, the tool may have a shape configured to engage with the second recess 150, or the tool may have a shape configured to engage with the first recess 110 and the second recess 150. The tool may have a shape including a surface configured to engage with an opposing surface of the first recess 110, the tool may have a shape including a surface configured to engage with an opposing surface of the second recess 150, or the tool may have a shape including a surface configured to engage with an opposing surface of the first recess 110 and the second recess 150. The second recess 150 may have a shape that is different than (e.g., non-equivalent to) a shape of the first recess 110.

As shown in FIG. 3, the shape of the first recess 110 may be hexalobular, and the shape of the second recess 150 may be rectilinear, e.g., a square. The shape of the second recess 150 may be different than the shape of the first recess 110. The shape of the second recess 150 may be the same as the shape of the first recess 110 however the size of the second recess may be different that a size of the first recess. The shape of the first recess 110 may be a lobed, e.g., hexalobular, as shown in FIG. 3. The shape of the second recess 150 may be rectilinear (e.g., a Robertson recess), as shown in FIG. 3. Advantageously, a fastener 10 having a first recess 110 and a second recess 150 of different shapes may be driven by different tool s, e.g., a tool having a shape corresponding to a shape of the first recess 110, a tool having a shape corresponding to a shape of the second recess 150, or a tool having a shape corresponding to a combination of the shape of the first recess 110 and the shape of the second recess 150.

The first recess 110 and the second recess 150 may be located on different planes 102, 104 of the stacked compound recess 100 relative to a major axis X of the fastener 10 having a stacked compound recess 100, as shown in FIG. 2. Advantageously, the first recess 110 and the second recess 150 being located on different planes 102, 104 may allow one recess to be driven independently of the other recess.

FIG. 2 illustrates a fastener 10 having a top surface 32 that is flat. As shown in FIG. 2, the first recess 110 is located on a first plane 102 of the stacked compound recess 100. The first plane 102 is located at a first distance D1 away from the top surface 32 as measured linearly along the major axis X of the fastener 10 having a stacked compound recess 100. The first recess 110 has a depth equivalent to the first distance D1. The first plane 102 may be oriented perpendicular to the major axis X of the fastener 10. As shown in FIG. 2, the second recess 150 is located on a second plane 104 of the stacked compound recess 100. The second plane 104 may be oriented perpendicular to the major axis X of the fastener 10. The second plane 104 may be oriented parallel to the first plane 102. The second plane 104 is located at a second distance D2 away from the top surface 32 as measured linearly along the major axis X of the fastener 10 having a stacked compound recess 100. The second recess 150 has a depth of a third distance D3, which is equivalent to the second distance D2 minus the first distance D1. A ratio of the first distance D1 to third distance D3 (i.e., D1/D3) may be between 1:10 to 10:1, 2:8 to 8:2, 3:7 to 7:3, or 4:6 to 6:4. The ratio of the first distance D1 to third distance D3 (i.e., D1/D3) may be equal to 1. A ratio of the third distance D3 to the first distance D1 (i.e., D3/D1) may be between 1:10 to 10:1, 2:8 to 8:2, 3:7 to 7:3, or 4:6 to 6:4. The ratio of the third distance D3 to the first distance D1 (i.e., D3/D1) may be equal to 1. The depth of the second recess 150 may be about equal to the depth of the first recess 110, and the third distance D3 may be about equal to the first distance D1. Further advantageously, the depth (i.e., distance D1) of the first recess 110 may be about equal to the depth (i.e., distance D3) of the second recess 150, one recess may not become engaged prior to the other recess, and the first recess 110 and the second recess 150 may be simultaneously engaged when being driven by a tool that mates with both the first recess 110 and the second recess 150. The disclosed configuration solves what is known as a 6/4 problem resulting from the combination of a hexalobular recess and a four-sided recess.

The first recess 110 initiates at a top surface 32 of the head 22 and extends into the head 22 to a bottom 130 of the first recess 110. The second recess may initiate at the bottom 130 of the first recess 110 and extend into the head 22 to a bottom 180 of the second recess 150, as shown in FIG. 2.

The first recess 110 includes a side wall 120 extending from the top surface 32 of the head 22 to a bottom 130 of the first recess 110 located at the first plane 102. The side wall 120 of the first recess 110 may form the shape of the first recess 110. The side wall 120 of the first recess 110 may be about parallel relative to the major axis X of the fastener 10, as shown in FIG. 2. The side wall 120 of the first recess 110 may be non-parallel relative to the major axis X of the fastener 10. The side wall 120 of the first recess 110 may be oriented at first angle α1 such that that side wall 120 is non-perpendicular relative to the bottom 130 of the first recess 110, e.g., non-perpendicular relative to the first plane 102. The first angle α1 may be greater than or equal to 60° and less than or equal to 90°. The first angle α1 may be 90°.

The second recess 150 includes a side wall 160 extending from the bottom 130 of the first recess 110 to a bottom 180 of the second recess 150 located at the second plane 104. The side wall 160 of the second recess 150 may form the shape of the second recess 150. The side wall 160 of the second recess 150 may be about parallel relative to the major axis X of the fastener 10, as shown in FIG. 2. The side wall 160 of the second recess 150 may be non-parallel relative to the major axis X of the fastener 10. Advantageously, orienting the side wall 120 of the first recess 110 or the side wall 160 of the second recess 150 at a non-parallel angle relative to the major axis X of the fastener 10 may produce a non-magnetic stick fit on a tool that mates with both the first recess 110 and the second recess 150.

The side wall 160 of the second recess 150 may be oriented at second angle α2 such that that side wall 160 is non-perpendicular relative to the second plane 104. The side wall 160 of the second recess 150 may be oriented at second angle α2 that not equivalent to the first angle α1. Advantageously, the second angle α2 being different from the first angle α1 may produce a non-magnetic stick fit on a tool that mates with both the first recess 110 and the second recess 150. The second angle α2 may be between 80° to 90°; 82° to 89°; or 84° to 88°. The second angle α2 may be between 88° to 88.5°. The second angle α2 may be 90°.

The shape of the first recess 110 of a stacked compound recess 100 in the top surface 32 of the head 22 of the fastener 10 may be seen in FIG. 3. In the illustrated embodiment of FIG. 3, the shape of the first recess 110 may be hexalobular and the shape of the second recess 150 may be rectilinear. The shape of the first recess 110 may be formed by side wall 120. The shape of the first recess 110 may be formed by one curved side wall 120 and the shape of the second recess 150 shape may be formed by four side walls 160.

The shape of the second recess 150 shape may be oriented relative to the shape of the first recess 110 such that features of the shape of the second recess 150 are positioned relative to features of the shape of the first recess 110 in a certain manner. For example, a rectilinear second recess 150 may include opposing first and second sides and opposing third and fourth sides, which are perpendicular to the first and second sides of the second recess 150. A hexalobular first recess 110 may include opposing first and second lobes, opposing third and fourth lobes, and opposing fifth and sixth lobes. The third and fifth lobes may be adjacent to one another and the fourth and sixth lobes may be adjacent to one another. The shape of the second recess 150 may be oriented relative to the shape of the first recess 110 such that the first side of the second recess 150 may be adjacent the first lobe of the first recess 100 and the second side of the second recess 150 may be adjacent the second lobe of the first recess 110. The third side of the second recess 150 may be adjacent an area between the third and fifth lobes and the fourth side of the second recess 150 may be adjacent an area between the fourth and sixth lobes.

FIG. 4 illustrates a tool 40 for use with the disclosed fastener. The tool 40 may have a shape configured to engage with the first recess 110 and the second recess 150, as shown, for example, in FIG. 2. The tool 40 may have a shape including a surface configured to engage with opposing surfaces of the first recess 110 and the second recess 150, as shown, for example, in FIG. 2. The tool may have a hexalobular upper shape 42 and a rectilinear lower shape 44.

Figure 5:
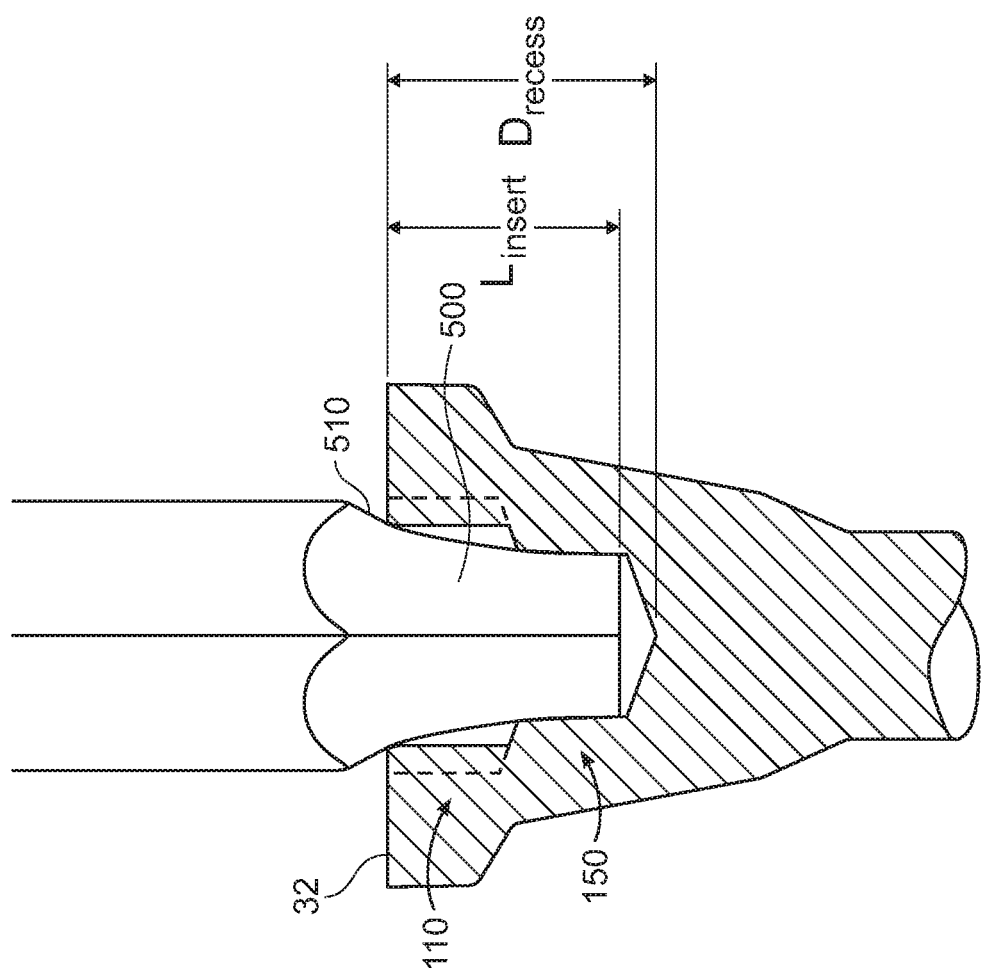
FIG. 5 illustrates an embodiment of a fastening system including a fastener and a tool for driving the fastener.

With further reference to FIG. 3, the first recess 110 includes a stability surface 300 oriented at an angle of greater than 1° and less than or equal to 89°, 2° to 80°, 4° to 70°, 5° to 50°, or 8° to 45°, relative to the side wall 120. With reference to FIG. 5, the stability surface 300 may allow a square tool 500 with a tapered side 510 to be inserted into the first recess 110 and the second recess 150. While not wanting to be bound by theory, it is understood that allowing a square tool 500 with a tapered side 510 to be inserted further into the first recess 110 and the second recess 150 may allow for an increased level of torque to be applied by the square tool 500. For example, without the stability surface 300, a tapered side 510 of a square tool 500 may contact the side wall 120 at a top surface 32 of the head 22, and may limit the extent to which the square tool 500 could be inserted into the first recess 110, the second recess 150, or the first recess 110 and the second recess. Limited insertion of the square tool 500 into the first recess 110, the second recess 150, or the first recess 110 and the second recess may result in undesirable wobble and prevent an adequate level of torque from being applied by the square tool 500 to drive the fastener 10. In addition, the contact of the tool 500 with the stabilization surface 300 can aid with proper alignment of the axis of the tool 500 to the axis of the fastener 10 and reduce stripping of the first recess 110 during application of torque to the square tool 500 during driving of the fastener 10.

The first recess 110 may include a hexalobular shape having a lobe-to-lobe distance of 5.55 millimeters to 5.65 millimeters, and the second recess 150 may include a rectilinear shape having a length of 2.82 millimeters to 2.86 millimeters. The stability surface 300 may be configured to allow 2.2 millimeters to 4.1 millimeters of the tool 500 to be inserted into the first recess 110 and the second recess 150. The stability surface 300 may be configured to allow 2.2 millimeters to 4.1 millimeters of the tool 500 to be inserted into the second recess 150.

The stability surface 300 may be configured to allow a tool to be inserted into at least 90% of a total recess depth of the fastener 10. With reference to FIG. 5, the length of the tool inserted into the recess ($L_{insert}$) may be at least 90%, for example, 90 to 99.9%, 92 to 99.9%, 94 to 99.5%, 96 to 99.5%, or 98 to 99%, of the total recess depth ($D_{recess}$) of the fastener 10. For a tool having a first shape portion, e.g., a first hexalobular shape portion configured to engage with a first recess 100, and a second shape portion, e.g., a second rectilinear shape portion configured to engage with a second recess 150, the length of the tool inserted into the recess ($L_{insert}$) may include the length of a portion of the second shape portion, or the length of an entirety of the second shape portion and optionally the length of at least a portion of the first shape portion. For a fastener 10 having a first recess, e.g., a first hexalobular recess, and a second recess, e.g., a second rectilinear recess, the total recess depth ($D_{recess}$) may be equal to a total depth of the first recess and the second recess. The length of the tool inserted into the recess ($L_{insert}$) and the total recess depth ($D_{recess}$) of the fastener 10 are measured in a direction parallel to the major axis of the fastener 10. Insertion of the tool into at least 90% of the total recess depth ($D_{recess}$) may minimize or eliminate wobble and reduce stripping during driving of the fastener 10.

The square tool 500 can be inserted into the first recess 110 and the second recess 150 to an extent such that the square tool 500 contacts a bottom 180 of the second recess 150. While not wanting to be bound by theory, it is understood that the square tool 500 contacting a bottom 180 of the second recess 150 may minimize or eliminate wobble during driving of the fastener 10, and allow for an increased level of torque to be applied by the square tool 500. A tapered side 510 of a square tool 500 can engage with the stability surface 300. While not wanting to be bound by theory, it is understood that a tapered side 510 of a square tool 500 engaging with the stability surface 300 may minimize or eliminate wobble during driving of the fastener 10. As the stability surface 300 may allow a square tool 500 with a tapered side 510 to be inserted further into the first recess 110 and the second recess 150, the second distance D2 can be increased, as compared to a fastener 10 without the stability surface 300, and a relatively increased level of torque can be applied by the square tool 500.

As shown in FIG. 3, the stability surface 300 may include more than one surface, e.g., two surfaces, to contact a tapered side 510 of a square tool 500. The first recess 110 may include 2 to 8, 3 to 6, or at least two, e.g., two, three, or four, stability surfaces 300 each oriented at an angle of greater than 1° and less than or equal to 89°, 2° to 80°, 4° to 70°, 5° to 50°, or 8° to 45°, relative to the side wall 120. The shape of the second recess 150 may be rectilinear. The stability surface 300 may be between adjacent lobes of the hexalobular first recess 110.

Figure 6:
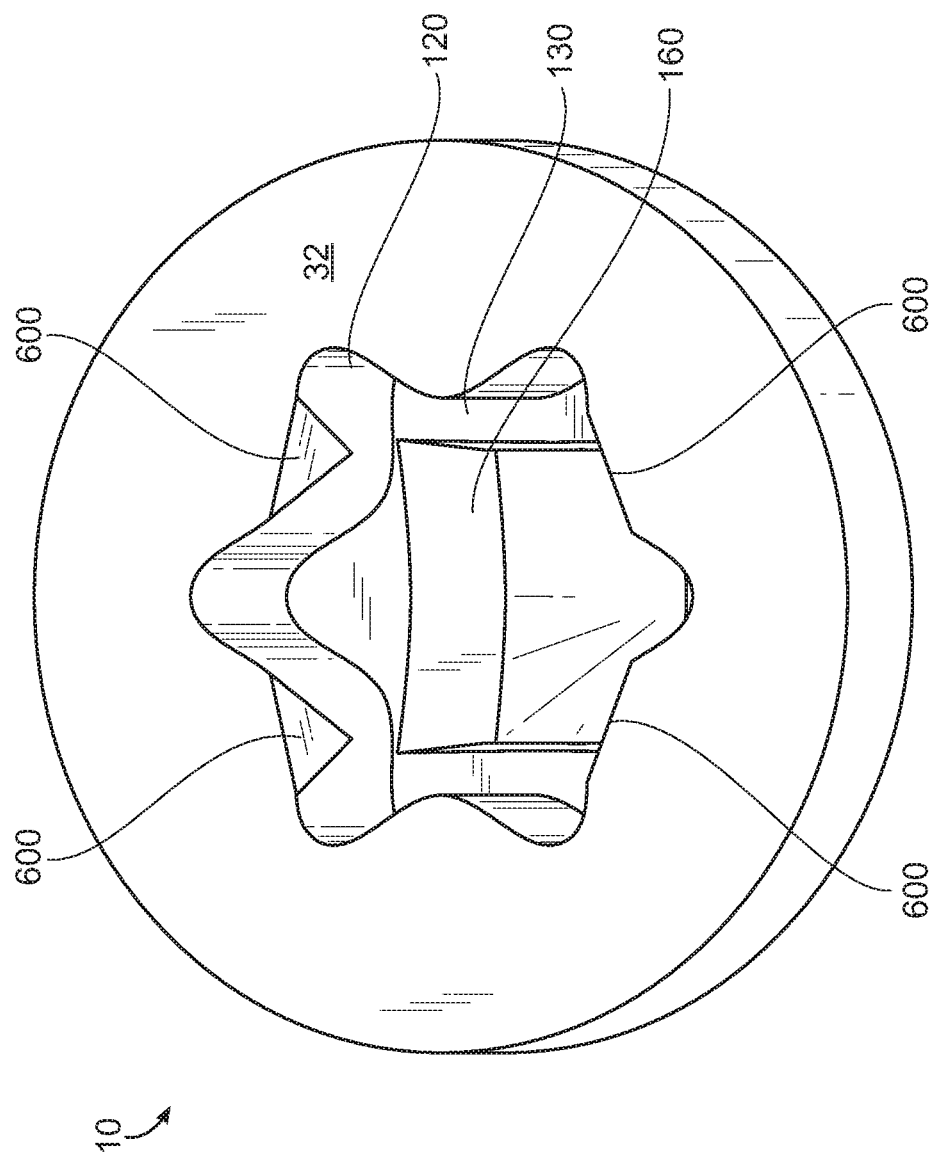
FIG. 6 illustrates an isometric view of the head of an embodiment of a fastener.

As shown in FIG. 6, a stability surface 600 may include a surface configured to contact a tapered side 510 of a square tool 500. The first recess 110 may include 2 to 8, 3 to 6, or at least two, e.g., two, three, or four, stability surfaces 600 each oriented at an angle of greater than 1° and less than or equal to 89° relative to the side wall 120. The shape of the second recess 150 may be rectilinear. The stability surface 600 may be between adjacent lobes of the hexalobular first recess 110.

Figure 7:
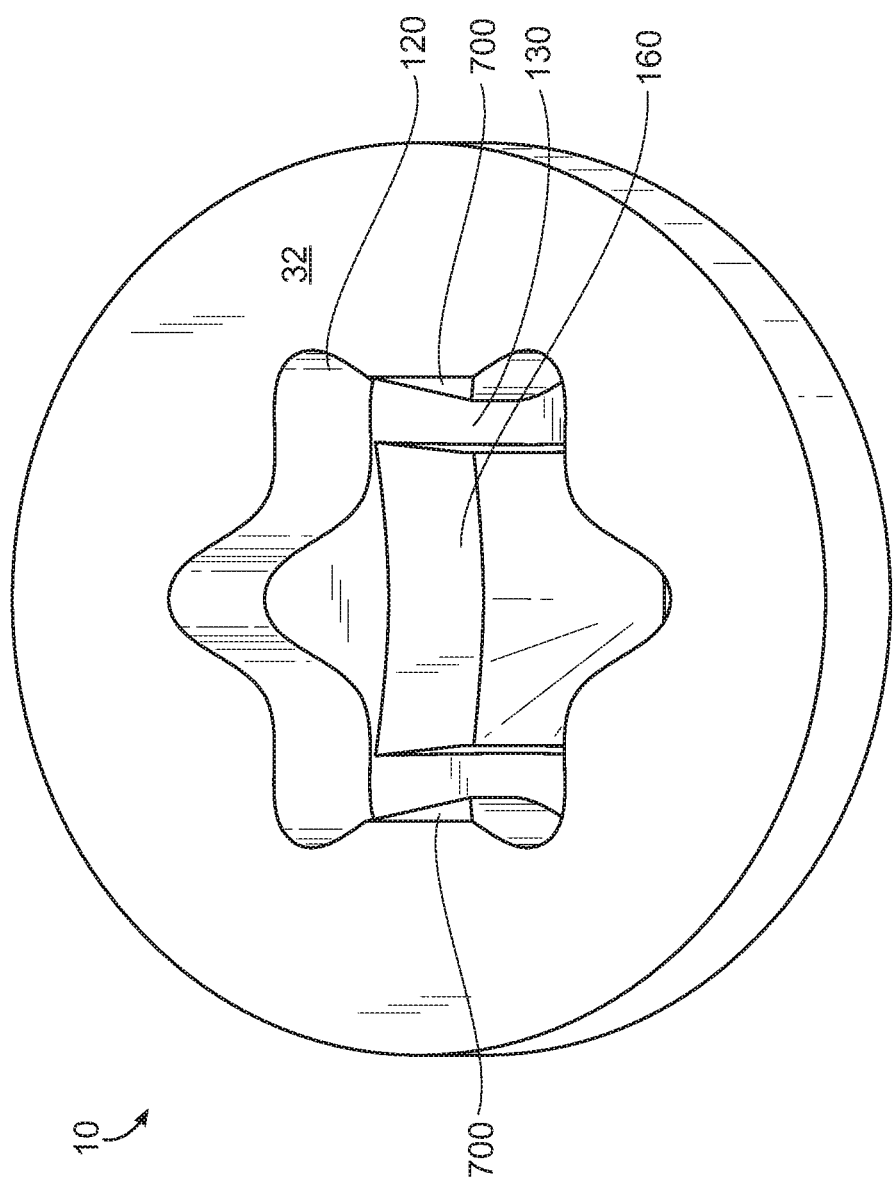
FIG. 7 illustrates an isometric view of the head of an embodiment of a fastener.

As shown in FIG. 7, a stability surface 700 may include a surface configured to contact a tapered side 510 of a square tool 500. The first recess 110 may include at least one, e.g., two, stability surfaces 700 each oriented at an angle of greater than 1° and less than or equal to 89°, 2° to 80°, 4° to 70°, 5° to 50°, or 8° to 45°, relative to the side wall 120. The shape of the second recess 150 may be rectilinear. The stability surface 700 may be between adjacent lobes of the hexalobular first recess 110.

A fastening system may include a fastener, which includes a first recess and a second recess adjacent the first recess. The first recess may include a hexalobular shape and a stability surface between adjacent lobes of the hexalobular shape. The fastening system may also include a tool having a shape configured to engage with the first recess, configured to engage with the second recess, or configured to engage with the first recess and the second recess. The tool may include a hexalobular shape configured to engage with the first recess and a rectilinear shape configured to engage with the second recess.

According to an embodiment, a method of forming the fastener may include providing a fastener blank; and shaping the fastener blank to provide the fastener having the head and the shank. For example, the method may include driving a punch into a head of the fastener to form the fastener including the first recess and the second recess in the head of the fastener to form the fastener.

A punch for forming a first recess and a second recess in a fastener may have a recess forming head including a first punch-tier and a second punch-tier for forming the first recess and the second recess, respectively. A cold-forming process to form a fastener including two recesses may include driving a punch into a blank head of a fastener. The material, e.g., metal, of the head of the fastener may become temporarily liquid under the extreme pressure and impact of the punch, and may flow around the shape of the punch. The recesses so-formed may adopt the shape and dimensions of the punch. The shape and dimensions of the punch may mirror the dimensions of the recesses formed. Thereafter, the punch may be removed from the head of the fastener, forming a fastener including a first recess and a second recess.

Aspects

In an aspect, disclosed is a fastener comprising: a first recess comprising a side surface defining a shape of the first recess, and a stability surface oriented at an angle of greater than 1° and less than or equal to 89° relative to a major axis of the threaded fastener; and a second recess adjacent the first recess.

In an aspect, disclosed is a fastener comprising: a threaded fastener, comprising a first recess comprising a hexalobular six lobed shape, and a stability surface between adjacent lobes of the hexalobular six lobed shape; a second recess adjacent the first recess; and a tool bit having a drive-shape configured to engage with the first recess, configured to engage with the second recess, or configured to engage with the first recess and the second recess.

In any of the various aspects, the first recess may comprise at least two stability surfaces each oriented at an angle of greater than 1° and less than or equal to 89° relative to the major axis of the threaded fastener; and/or the first recess may comprise a hexalobular six lobed shape; and/or the stability surface may be between adjacent lobes of the hexalobular six lobed shape; and/or the side surface may be oriented at an angle of greater than or equal to 0° and less than or equal to 30° relative to the major axis of the threaded fastener; and/or the angle of orientation of the side surface relative to the major axis of the fastener may be less than the angle of orientation of the stability surface relative to the major axis of the fastener; and/or the first recess may comprise a hexalobular six lobed shape having a lobe-to-lobe distance of 5.55 millimeters to 5.65 millimeters, and the second recess may comprise a rectilinear shape having a length of 2.82 millimeters to 2.86 millimeters; and/or the second recess may comprise a rectilinear shape; and/or the first recess may comprise four stability surfaces each oriented at an angle of greater than 1° and less than or equal to 89° relative to the major axis of the threaded fastener; and/or the first recess may comprise a hexalobular six lobed shape, and each of the stability surfaces may be between adjacent lobes of the hexalobular six lobed shape; and/or the threaded fastener may comprise: a head comprising the first recess and the second recess; and a shank extending from the head in a direction along the major axis of the threaded fastener; and/or a method of forming the fastener may comprise driving a punch into a head of the threaded fastener to form the threaded fastener including the first recess and the second recess in the head of the threaded fastener to form the threaded fastener; and/or a fastening system may comprise the threaded fastener; and a tool bit having a drive-shape configured to engage with the first recess, configured to engage with the second recess, or configured to engage with the first recess and the second recess; and/or the stability surface may be configured to contact the tool, when the tool is inserted in the first recess and the second recess; and/or the first recess may comprise a hexalobular six lobed shape having a lobe-to-lobe distance of 5.55 millimeters to 5.65 millimeters, and the second recess may comprise a rectilinear shape having a length of 2.82 millimeters to 2.86 millimeters; and/or the stability surface may be between adjacent lobes of the hexalobular six lobed shape; and/or the stability surface may be configured to allow the tool bit to be inserted into at least 90% of a total depth of the first recess and the second recess, the depth being measured in a direction parallel to the major axis of the threaded fastener; and/or the tool bit may comprise: a first hexalobular six lobed shape drive-shape configured to engage with the first recess; and a second rectilinear drive-shape configured to engage with the second recess; and/or the stability surface may be configured to allow the tool bit to be inserted into at least 90% of a total depth of the first recess and the second recess, the depth being measured in a direction parallel to a major axis of the threaded fastener.

The invention has been described with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fastener comprising:
a first recess comprising
a side surface defining a shape of the first recess, and
exactly four stability surfaces each oriented at an angle of greater than 1° and less than or equal to 89° relative to a major axis of the fastener; and
a second recess adjacent the first recess,
wherein the first recess comprises a hexalobular shape,
wherein each of the stability surfaces is between adjacent lobes of the hexalobular shape,
wherein the second recess comprises a bottom and side surfaces defining a rectilinear shape consisting of four sides, and
wherein two of the stability surfaces are oriented at a first side of the second recess and two of the stability surfaces are oriented at a second side of the second recess opposite the first side.

2. The fastener of claim 1, wherein the side surface is oriented at an angle of greater than or equal to 0° and less than or equal to 30° relative to the major axis of the fastener.

3. The fastener of claim 2, wherein the angle of orientation of the side surface relative to the major axis of the fastener is less than the angle of orientation of the stability surfaces relative to the major axis of the fastener.

4. The fastener of claim 1, wherein:
the first recess has a lobe-to-lobe distance of 5.55 millimeters to 5.65 millimeters, and
the second recess has a length of 2.82 millimeters to 2.86 millimeters.

5. The fastener of claim 1, comprising:
a head comprising the first recess and the second recess; and
a shank extending from the head in a direction along the major axis of the fastener.

6. A method of forming the fastener of claim 1, the method comprising:
driving a punch into a head of the fastener to form the fastener including the first recess and the second recess in the head of the fastener to form the fastener.

7. A fastening system, comprising:
the fastener of claim 1; and
a tool for driving the fastener having a shape configured to engage with the first recess, configured to engage with the second recess, or configured to engage with the first recess and the second recess.

8. The fastening system of claim 7, wherein the stability surfaces are configured to contact tapered sides of a tool having a shape configured to engage with the second recess, when the tool having the shape configured to engage with the second recess is inserted in the first recess and the second recess.

9. The fastening system of claim 7, wherein:
the first recess has a lobe-to-lobe distance of 5.55 millimeters to 5.65 millimeters, and
the second recess has a length of 2.82 millimeters to 2.86 millimeters.

10. The fastening system of claim 9, wherein the stability surfaces are configured to allow a tool having a shape configured to engage with the second recess to be inserted into at least 90% of a total depth of the first recess and the second recess, the depth being measured in a direction parallel to the major axis of the fastener.

11. A fastening system, comprising:
a fastener, comprising
a first recess comprising
a hexalobular shape, and
at least four stability surfaces between adjacent lobes of the hexalobular shape;
a second recess adjacent the first recess; and
a tool for driving the fastener having a shape configured to engage with the first recess, configured to engage with the second recess, or configured to engage with the first recess and the second recess,
wherein each of the stability surfaces is between adjacent lobes of the hexalobular shape,
wherein the second recess comprises a bottom and side surfaces defining a rectilinear shape consisting of four sides,
wherein exactly two of the stability surfaces are oriented at a first side of the second recess and exactly two of the stability surfaces are oriented at a second side of the second recess opposite the first side, and
wherein the stability surfaces are configured to allow a tool having a shape configured to engage with the second recess to be inserted into at least 90% of a total depth of the first recess and the second recess, the depth being measured in a direction parallel to a major axis of the fastener.

12. The fastening system of claim 11, wherein the tool for driving the fastener comprises:
a first hexalobular shape configured to engage with the first recess; and
a second rectilinear shape configured to engage with the second recess.

13. The fastener of claim 11, wherein the stability surfaces are configured to allow the tool having the shape configured to engage with the second recess to be inserted into at least 92 to 99.9% of a total depth of the first recess and the second recess, the depth being measured in a direction parallel to a major axis of the fastener.

14. The fastening system of claim 11, wherein the stability surfaces are configured to contact tapered sides of the tool having the shape configured to engage with the second recess, when the tool having the shape configured to engage with the second recess is inserted in the first recess and the second recess.

15. A fastening system, comprising:
   a fastener comprising
      a first recess comprising
         a side surface defining a shape of the first recess, and
         at least four stability surfaces oriented at an angle of greater than 1° and less than or equal to 89° relative to a major axis of the fastener, and
      a second recess adjacent the first recess; and
   a tool for driving the fastener having a shape configured to engage with the first recess, configured to engage with the second recess, or configured to engage with the first recess and the second recess,
   wherein the second recess comprises a bottom and side surfaces defining a rectilinear shape consisting of four sides,
   wherein exactly two of the stability surfaces are oriented at a first side of the second recess and exactly two of the stability surfaces are oriented at a second side of the second recess opposite the first side, and
   wherein the stability surfaces are configured to allow a tool having a shape configured to engage with the second recess to be inserted into at least 90% of a total depth of the first recess and the second recess, the depth being measured in a direction parallel to the major axis of the fastener.

16. The fastening system of claim 15, wherein the first recess comprises a hexalobular shape.

17. A fastener of comprising:
   a first recess comprising
      a side surface defining a shape of the first recess, and
      at least four stability surfaces each oriented at an angle of greater than 1° and less than or equal to 89° relative to a major axis of the fastener; and
   a second recess adjacent the first recess,
   wherein the first recess comprises a hexalobular shape,
   wherein each of the stability surfaces is between adjacent lobes of the hexalobular shape,
   wherein the second recess comprises a bottom and side surfaces defining a rectilinear shape consisting of four sides, and
   wherein exactly two of the stability surfaces are oriented at the first side of the second recess and exactly two of the stability surfaces are oriented at the second side of the second recess opposite the first side.

* * * * *